United States Patent [19]

Hilton et al.

[11] Patent Number: 4,830,172
[45] Date of Patent: May 16, 1989

[54] ROTARY FEEDER

[75] Inventors: Sydney Hilton; Dean Arthur L., both of Indiana, Pa.

[73] Assignee: FMC Corporation, Chicago, Ill.

[21] Appl. No.: 110,608

[22] Filed: Oct. 20, 1987

Related U.S. Application Data

[63] Continuation of Ser. No. 810,107, Dec. 17, 1985, abandoned.

[51] Int. Cl.⁴ .............................................. B65G 29/00
[52] U.S. Cl. ....................................... 198/392; 198/443
[58] Field of Search ............... 198/392, 389, 390, 391, 198/393, 443, 803.16; 221/159, 160

[56] References Cited

U.S. PATENT DOCUMENTS

| 2,888,169 | 5/1959 | Hausman et al. | 221/167 |
| 3,027,698 | 4/1962 | Howells | 198/443 X |
| 3,049,215 | 8/1962 | Hutter et al. | 198/392 X |
| 3,543,909 | 12/1970 | Ueda | 198/392 |
| 3,682,293 | 8/1972 | Kamp | 198/392 |
| 3,735,859 | 5/1973 | Miller | 198/392 |
| 3,815,729 | 6/1974 | Mortensen | 198/392 |
| 4,254,859 | 3/1981 | Basso | 198/392 |
| 4,383,602 | 5/1983 | Giles | 198/396 |
| 4,699,261 | 10/1987 | Nesin | 198/398 |

FOREIGN PATENT DOCUMENTS

| 686847 | 9/1979 | U.S.S.R. | 198/392 |
| 1024730 | 4/1966 | United Kingdom | 198/392 |
| 1118952 | 7/1968 | United Kingdom . | |
| 1282842 | 7/1972 | United Kingdom . | |
| 1454473 | 11/1976 | United Kingdom . | |
| 2169885 | 7/1986 | United Kingdom . | |
| 2171683 | 9/1986 | United Kingdom . | |
| 2171682 | 9/1986 | United Kingdom . | |

OTHER PUBLICATIONS

Instruction Manual, Centrifugal Feeder FR-Series, Model FR-20, FR-30, Hoppmann Corporation, dated Oct. 1985, FIG. 1a, FR 20(11-85), FIG. 1b, FR-30(-11-85), & Table of Contents.
FR-Series, Application and Tooling, Instruction Manual, dated May 1983, Table of Contents (2 pp.), List of Illustrations (1 p.), FIG. 3-2 (p.•10), FIG. 3—3 (p. 11), FIG. 3-5 (p. 14), FIG. 3-6 (p. 17), FIG. 3-7 (p. 18).

Primary Examiner—Robert J. Spar
Assistant Examiner—Cheryl L. Gastineau
Attorney, Agent, or Firm—Douglas W. Rudy; Richard B. Megley

[57] ABSTRACT

A rotary article feeder has a bowl having a substantial conical base section joining an upwardly extending and outwardly displaced sidewall section. Articles to be handled contact the outer wall and are assisted in transport out of the bowl through contact with the ever increasing circumference of the bowl sidewall as the articles move upwardly on an inclined stationary ramp to a transport surface for distribution through various fence and wiper accessories.

6 Claims, 2 Drawing Sheets

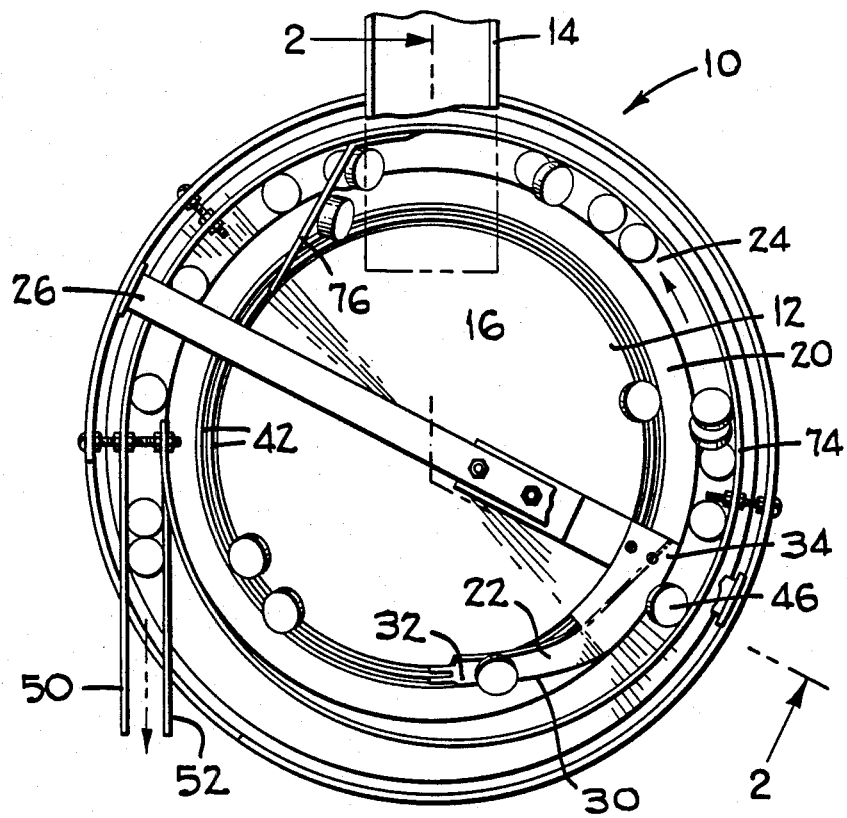
FIG_1
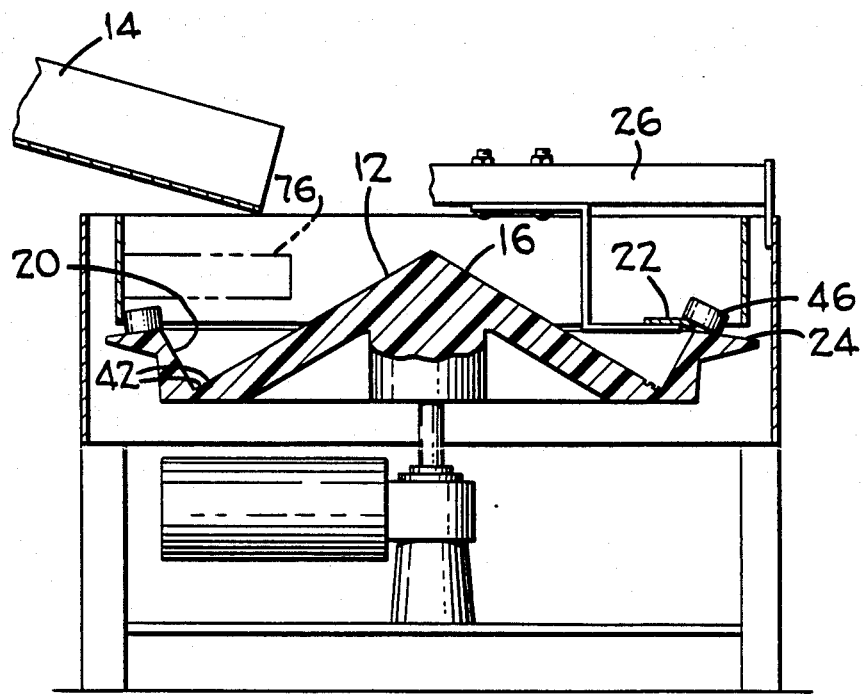
FIG_2

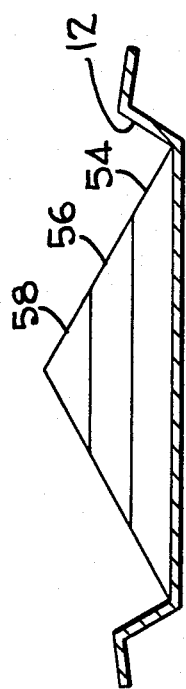
FIG_4
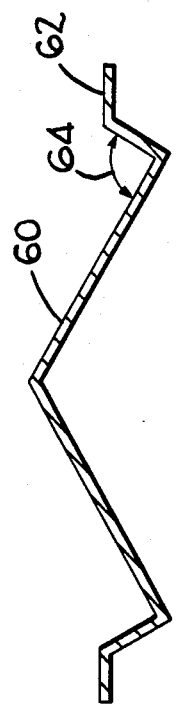
FIG_5
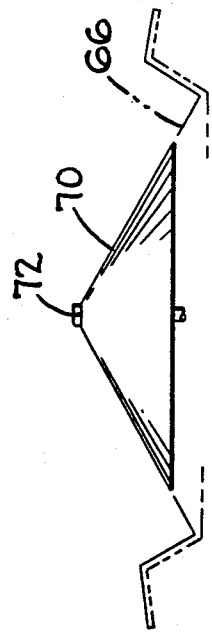
FIG_6
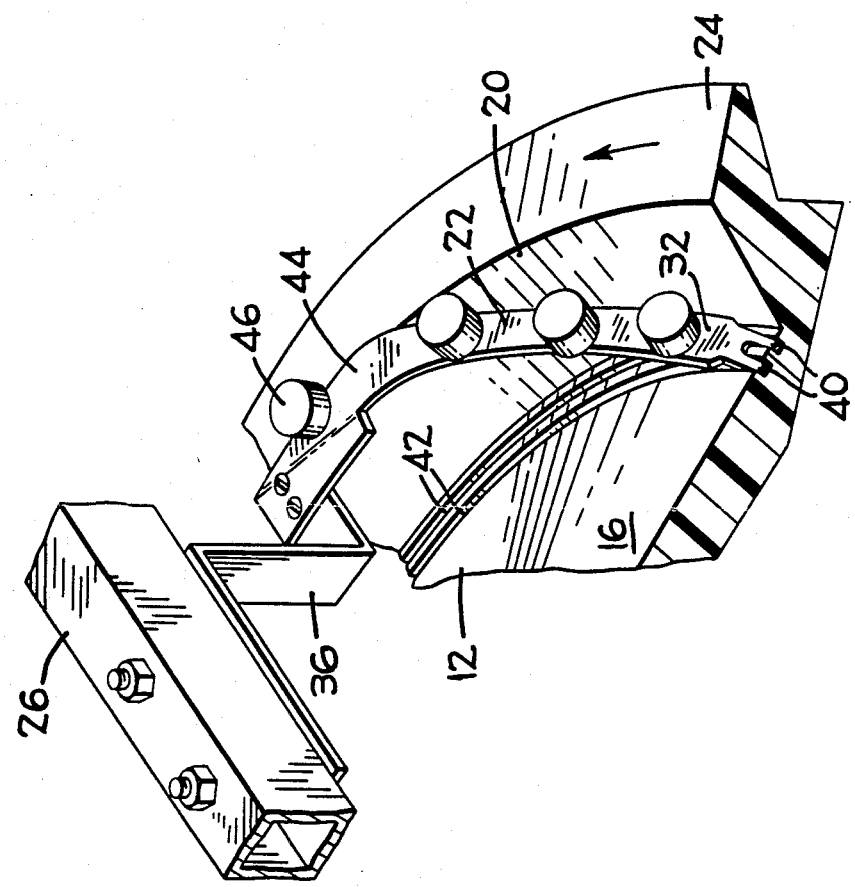
FIG_3

ROTARY FEEDER

This application is a continuation, of application Ser. No. 06/810,107, filed 12/17/85, now abandoned.

The invention presented herein is a rotary feeder for feeding articles from a bulk storage facility to an orienting take away unit. The feed bowl is provided with a conically shaped bottom surrounded by upwardly and outwardly extending side walls in communication with the bowl bottom. The side walls form an included angle of at least ninety degrees with the base or bottom of the bowl.

Article feeders using a rotary bowl for holding parts to be fed are known. One such feeder uses a bowl having verical side walls and a stationary ramp to move articles out of the bowl. Once out of the bowl the articles are moved across a planar surface by centrifugal force for ultimate distribution from an escapement device. The centrifugal forces necessary to move articles in this type of feeder is not advantageous due to the resultant erratic behavior of the articles when subjected to rotational speeds of the feeder sufficiently high to generate adequate centrifugal force to provide transport of the articles to be fed.

The article feeder disclosed herein accomplishes a smooth, controlled feed without detrimental article mishandling sometimes found in bowl feeders having higher rotational speeds.

BRIEF DESCRIPTION OF THE DRAWING FIGURES

The essense of this invention will be clearly apparent from a perusal of the following description when read in conjunction with the drawing figures wherein:

FIG. 1 is a top view of the rotary feeder bowl;

FIG. 2 is a cross section through plane 2—2 of FIG. 1;

FIG. 3 is a perspective view of a portion of the bowl and the ramp therein;

FIG. 4 is a cross section of a bowl showing multiple conical elements therein.

FIG. 5 is an alternative bowl configuration shown in cross-section.

FIG. 6 is an alternative bowl configuration in broken lines showing a conical insert.

DETAILED DESCRIPTION OF THE INVENTION

Turning first to FIGS. 1 and 2 the operative parts of the invention can clearly be seen. The rotary feeder, generally 10, comprises an article receiving means 12 which may be a container or bowl for receiving articles to be handled from a hopper 14 or other bulk storage means. The article receiving means has a substantial conical base or surface portion 16 which, at the periphery of the base of the cone, is associated with an inclined wall 20 extending upwardly from the base of the cone. In a preferred embodiment the angle between the cone surface and the inclined side wall will be ninety degrees but as will be explained later this angle could be more than ninety degrees.

The article receiving means houses an article selection means 22 or take away ramp. The ramp 22 is configured to provide a means or path allowing articles in the bowl 12 to be removed therefrom and positioned on a transport means 24 which may be the rim or lip of the bowl.

The take away ramp is attached to a beam 26 and held stationary in the bowl 12 primarily adjacent the inclined wall 20 along the ramp's most outboard edge 30. The entry end 32 of the ramp 22 is adjacent the surface 16 of the conical base while terminating at a discharge means 34 at a relatively higher elevation. The ramp discharge means 34 is adjacent the rim 24 of the bowl 12 so that articles transported up the ramp 22 may be deposited on the rim.

A preferred ramp 22 is shown in FIG. 3.

In this figure, which is an enlarged portion of the machine shown generally as 10, the bowl 12 can be seen with the upwardly extending and outwardly angled wall portion 20 bridging the space between the bowl surface and the rim 24 of the bowl. This view clearly shows one embodiment of the ramp 22 attached by a bracket 36 to the cross beam 26.

The ramp 22 has the entry end 32 with tongue members such as 40 which fit into groove members 42 in the bowl. The ramp extends upwardly from the base 16 at a relatively steep angle to a discharge section 4 which is angled downwardly so that articles such as the discs, shown as 46, will be urged off the discharge section of the ramp by gravity onto the rim 24.

The articles 46, once on the rim 24, will remain there and travel on the rim 24 until the articles enter a chute 50 which has an inner wall or fence 52 to guide the article off the rim 24.

FIG. 4 is a simplified drawing of the bowl 12 of FIG. 1 but having the conical center section made up of several truncated cone sections 54 and 56 and a cone 58. The truncated cones and the cone 58 are contemplated as having different heights and wall angles, or any combination of heights and wall angles, such that pieces of different dimensions could be used in a generic bowl to give a desired article flow throughout the bowl. For instance, the cone 58 could be more steeply sloped than the truncated cones 56 and 54 and each of truncated cones could have different slopes. One embodiment contemplated doesn't use the cone 58 at all but terminates at the truncation of an inserted cone.

FIG. 5 is a simplified embodiment of a bowl 60 similar to the bowl 12 but having the rim portion generally horizontal. Furthermore, this embodiment is used to show that the angle 64, previously stated to be ninety degrees in a preferred embodiment could be more than ninety degrees as determined by the exigencies of the parts being fed from the bowl and the desired feeding characteristics.

FIG. 6 presents a simplified view of a bowl shown in a phantom line view with a cone 70 placed in the bowl and attached to the bowl by a fastener such as 72. The cone is contemplated to be removable so that a bowl could be run either with or without the cone.

The operation of the rotary bowl feeder can be envisioned by looking at FIGS. 1 and 3. In FIG. 1 a plurality of articles to be fed such as the discs 46 are supplied to the bowl 12 from the hopper 14. The bowl is being rotated at a low rotational speed, in a preferred embodiment between four and twenty-five RPM. Discs being fed into the bowl will flow down the surface of the cone, which is the bottom of the bowl by gravity until they are adjacent the side wall of the bowl. As the bowl rotates the articles will be picked up by the ramp and will be urged up the ramp by back pressure provided by subsequently picked up articles and/or the geometry of the wall. Since the bowl wall extends outwardly, presenting an ever increasing radius of the bowl as the parts move upward on the ramp, the peripheral speed seen by the article at its point of contact with the wall will be increasing. Parts or articles will experience some acceleration as they move up and out of the bowl. Since the ramp is at right angles to the bowl wall gravity will help keep parts against the wall. It may be well to point out at this point that it is contemplated that the wall surface could be coated or formed with a friction improving surface to assist the promotion of articles up the ramp.

Once the articles reach the top of the ramp discharge means 34 they will slide off the ramp onto the rim 24. A fence 74 will hold the articles in position on the rim 24 although the downward sloping profile of the rim allows gravity to move the articles to the fence 74. The articles will be carried on the rim to the chute 50 where the inner wall 52 of the chute will guide the articles across the rim to the next stage in the transportation of the article.

In FIG. 1 it can be seen that the fence 74 guides the articles to the chute 50, along the way however, any articles that are stacked upon another article are displaced by a wiper 76 which acts to singulate the stacked articles.

The foregoing description attempts to set forth the best mode of carrying out the invention however, it is contemplated that nuances of design differing in execution will be encompassed by the following claims.

What is claimed is:

1. A rotary article feeder comprising
   a rotary bowl having a conical bottom converging upwardly from a circular base periphery planar with the horizon into an apex and having a frusto-concical sidewall diverging upwardly from the circular base into a circular opening and having a truncated conical transporting rim extending radially outwardly and downwardly from the circular opening, wherein the angle between the conical bottom and the frusto-conical sidewall is approximately 90° and the truncated conical rim is non-planar with the horizon and at an angle less than 270° with the frusto-conical sidewall;
   an inclined stationary article removal ramp within the bowl having a bottom article sweeping end shaped to sweep articles upwardly from the conical bottom and having an article feeding side adjacent to the frusto-conical sidewall shaped to feed articles upwardly along the ramp in contact with the frusto-conical sidewall and having a top transition end at the circular opening shaped to receive and slide articles downwardly and outwardly onto the truncated conical rim; and
   a stationary spiral article guide means for guiding articles riding on the truncated conical rim to a discharge opening formed by opposite ends of the spiral guide means.

2. The rotary article feeder according to claim 1, further including means for singulating articles onto the truncated conical rim in contact with the spiral guide means; and including means for receiving the singulated articles from the discharge opening and moving the articles in an orderly manner from the bowl.

3. The rotary article feeder according to claim 1, wherein the truncated conical rim is vertically spaced below the apex of the conical bottom.

4. The rotary article feeder according to claim 3, wherein the conical bottom comprises a top conical section mounted to a plurality of truncated conical sections forming a continuous conical bottom, and the bottom most truncated conical section is mounted to the frusto-conical sidewall.

5. The rotary article feeder according to claim 3, wherein the conical bottom is mounted to a truncated conical section having the frusto-conical sidewall and the truncated conical rim.

6. The rotary article feeder according to claim 3, wherein the conical bottom comprises a plurality of truncated cones topped by a cone.

* * * * *